UNITED STATES PATENT OFFICE.

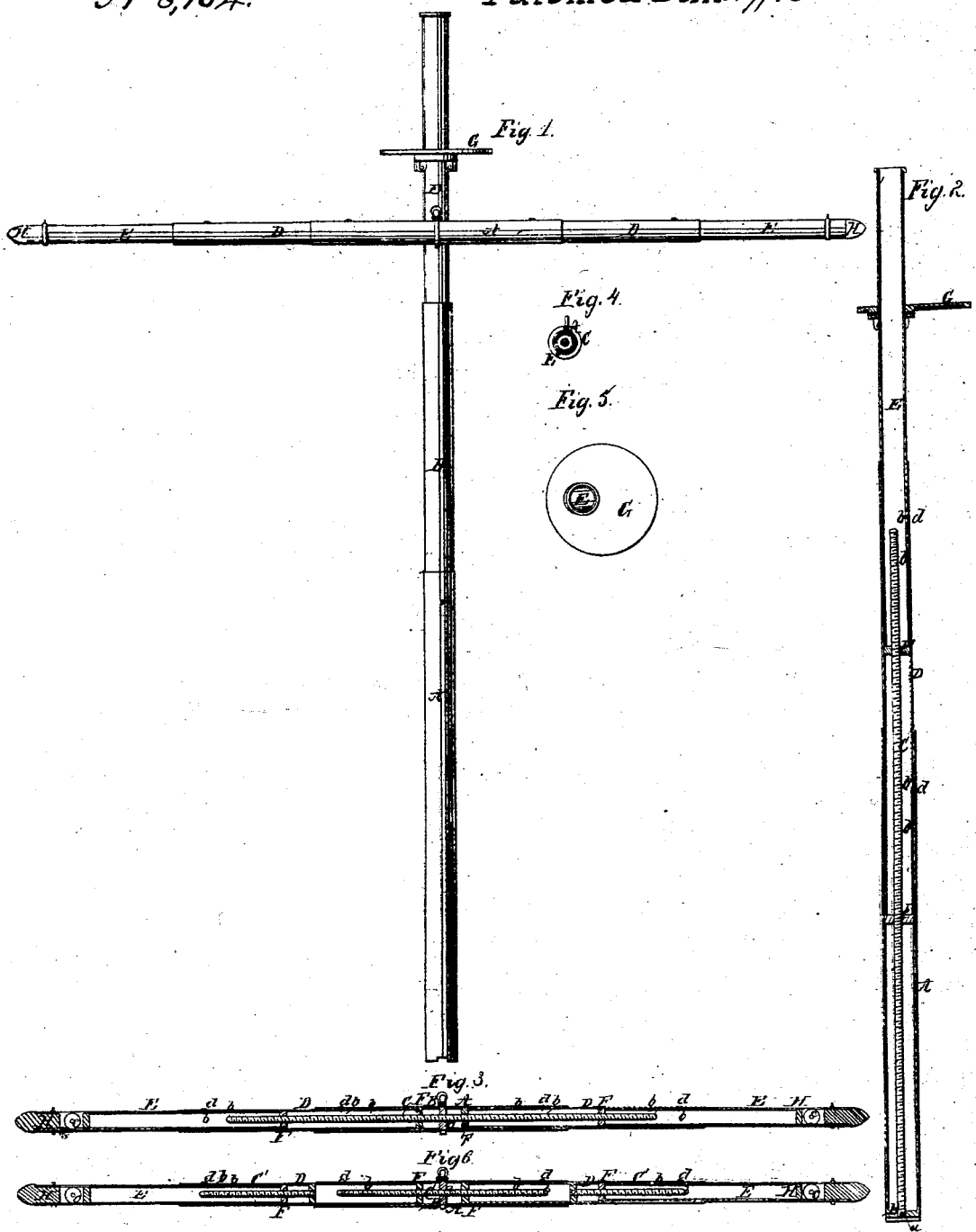

CHAS. F. BROWN, OF WARREN, RHODE ISLAND.

CONNECTION OF TELESCOPIC MASTS AND SPARS.

Specification of Letters Patent No. 8,164, dated June 17, 1851.

*To all whom it may concern:*

Be it known that I, CHARLES F. BROWN, of Warren, in the county of Bristol and State of Rhode Island, have invented a new and useful improvement in the mode of forming connections in tubular metallic or telescopic masts yards and other spars of ships and other vessels; and I do hereby declare that the following is a full, clear, and exact description of the same, reference being had to the accompanying drawings, forming part of this specification, in which—

Figure 1, is an elevation of a lower mast and yard. Fig. 2, is a longitudinal section of the mast. Fig. 3, is a longitudinal section of the yard and Fig. 4, is a transverse section of the same. Fig. 5, is a top view of the mast. Fig. 6 is a longitudinal section of a yard exhibiting a modification in the construction.

Similar letters of reference indicate corresponding parts in each of the several figures.

The nature of my invention consists in connecting the tubes together and adjusting them by means of a screwed rod or rods running longitudinally through them each rod being secured in one tube so as to be incapable of turning and passing through a nut or nuts in one or more of the other tubes, the whole series of tubes being adjustable one within another by turning those in which are the nuts so as to move the nuts along the screw on the rod, and each tube being capable of being secured by set screws at various points of its length.

To enable others skilled in the art to make and use my invention I will proceed to describe fully its construction and practical application.

A, Figs. 1, 2, 3, and 4 represents the outermost or largest tube which in the mast is the lower one, and in the yard the middle one.

At the bottom of the mast or middle of the yard there is a socket B, see Figs. 2, 3, and 6, in which is secured a rod C, screwed along its whole length or any suitable portion of it. The rod may be secured in this socket by a pin *a*, passing through them and the tube, or by any other means which will prevent its turning, the socket may be also secured in the tube by the same pin, or by other means. In the mast the rod will be only required to proceed upwards, but in the yard, in both directions from the center.

D, and E, are the inner tubes, D, fitting in A, and E, in D; in the yard these tubes will have to be in each end of A; at the lower or inner end of each of these tubes a nut F, is secured so as to be capable of turning with it; these nuts fit the screwed rod C, and by turning either tube in the one encasing it, it may be screwed into or out from it. In each incasing tube near its end, there are one or more holes, through either of which a set screw *d*, passes and is screwd into one of a row of holes *b*, in the tube inside it, the said holes having female screws inside them, by these means the tubes may be secured in various positions and the length of the yard or mast may be varied.

G, Figs. 1, and 2 and 5, is the round top which may be of wrought or cast iron and secured to the mast in any suitable manner.

H, Figs. 1, 3, and 6, are plugs of wood inserted in the ends of the smallest or end tubes E, of the yard, to preserve their form and give them the necessary strength where the mortice is cut through to receive the sheave *c*, for the sheet.

The difference in construction between the yard represented in Fig. 6, and that in Fig. 2, consists only in employing separate rods for connecting each two of the tubes; that C, being shortened and only serving to connect A, and D, and other short rods C' being secured in D in a manner similar to that in which C, is secured in A, and serving to connect E. The same mode of connecting the joints may also be applied to the mast.

The upper masts are to be formed in the same manner as the lower ones, and fit into them, and are to be connected by other screwed rods secured to the upper joints of the masts immediately below them. The spare masts and spars when stowed away can be screwed as far as possible into one another; or the screwed rods may be taken out, when they may be slipped into one another, the length will then be very much reduced, and very little room will be occupied by them. The screw and nut forms a very secure connection which admits of great accuracy in the adjustment of the length and also of the length being easily altered.

Any spars may be constructed in the same manner, but as all partake either of the character of the mast or yard and are of the same form, farther description of them is unnecessary. In some cases by unscrewing the tubes and increasing the length the rigging may be set up or tightened.

What I claim as my invention and desire to secure by Letters Patent, is—

Connecting and adjusting the several joints of masts, yards, and all spars constructed of telescopic tubes, or tubes fitting one within another, by means of a screwed rod C, or screwed rods C, and C', nuts and female screws F, and set screws $d$, or their equivalents, the whole being inserted in and secured or attached to the tubes, and operating in the manner substantially as herein set forth.

C. F. BROWN.

Witnesses:
 SAMUEL RANDALL,
 G. W. CARR.